United States Patent
Asai et al.

(10) Patent No.: US 12,018,355 B2
(45) Date of Patent: Jun. 25, 2024

(54) METHOD OF MANUFACTURING ALUMINUM ALLOY FORGED MATERIAL

(71) Applicant: TOYOTA JIDOSHA KABUSHIKI KAISHA, Toyota (JP)

(72) Inventors: Chihiro Asai, Toyota (JP); Takehito Kobayashi, Okazaki (JP); Hajime Kawabata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 150 days.

(21) Appl. No.: 17/650,682

(22) Filed: Feb. 11, 2022

(65) Prior Publication Data

US 2022/0290281 A1 Sep. 15, 2022

(30) Foreign Application Priority Data

Mar. 9, 2021 (JP) .................................. 2021-037420

(51) Int. Cl.
| | | |
|---|---|---|
| *C22F 1/05* | (2006.01) | |
| *C22C 21/08* | (2006.01) | |
| *C22F 1/047* | (2006.01) | |
| *C22C 21/06* | (2006.01) | |
| *C22F 1/043* | (2006.01) | |

(52) U.S. Cl.
CPC .............. *C22F 1/047* (2013.01); *C22C 21/08* (2013.01)

(58) Field of Classification Search
CPC ................................................ C22F 1/04–057
See application file for complete search history.

(56) References Cited

U.S. PATENT DOCUMENTS

| | | |
|---|---|---|
| 6,355,090 B1 | 3/2002 | Ohyama et al. |
| 2017/0073802 A1 | 3/2017 | Hori et al. |

FOREIGN PATENT DOCUMENTS

| | | | | |
|---|---|---|---|---|
| CN | 1263566 A | | 8/2000 | |
| CN | 106103765 A | | 11/2016 | |
| JP | 3-215646 | * | 9/1991 | ............. C22C 21/06 |
| JP | 2001-162318 | * | 6/2001 | ............. B21C 23/00 |
| JP | 2015193903 A | | 11/2015 | |
| JP | 2019123902 A | | 7/2019 | |

* cited by examiner

*Primary Examiner* — Lois L Zheng
(74) *Attorney, Agent, or Firm* — SoraIP, Inc.

(57) ABSTRACT

A method of manufacturing an aluminum alloy forged material from a mixture containing an aluminum scrap, an aluminum virgin metal, and an additive element includes the following steps: a heating and melting step of heating and melting the mixture, a forging step of forging the mixture after heating and melting, and an aging treatment step of performing aging treatment on a material after the forging step under a condition that an aging temperature and an aging time are as follows: (aging temperature, aging time) =within a range of a region surrounded by (185, 4), (185, 7), (200, 1), and (200, −2/25x+8).

16 Claims, 5 Drawing Sheets

METHOD OF MANUFACTURING ALUMINUM ALLOY FORGED MATERIAL

CROSS-REFERENCE TO RELATED APPLICATION

This application claims priority to Japanese Patent Application No. 2021-037420 filed on Mar. 9, 2021, incorporated herein by reference in its entirety.

BACKGROUND

1. Technical Field

The present disclosure relates to a method of manufacturing an aluminum alloy forged material.

2. Description of Related Art

In recent years, in a field of a vehicle, an application of an aluminum alloy forged material to an undercarriage component, such as an upper arm and a lower arm, has been expanding in order to improve steering stability and comfort of a vehicle in addition to weight reduction. Examples of the aluminum alloy forged material applied to the undercarriage component of the vehicle include an Al—Mg—Si-based aluminum alloy that is lightweight, and has high strength and high corrosion resistance.

For example, Japanese Unexamined Patent Application Publication No. 2015-193903 (JP 2015-193903 A) discloses an aluminum alloy forged material made of an aluminum alloy containing Mg: 0.70% to 1.50% by mass, Si: 0.80% to 1.30% by mass, Cu: 0.30% to 0.90% by mass, Fe: 0.10% to 0.40% by mass, Ti: 0.005% to 0.15% by mass, one or more elements selected from Mn: 0.10% to 0.60% by mass, Cr: 0.10% to 0.45% by mass, Zr: 0.05% to 0.30% by mass, and a remainder consisting of Al and unavoidable impurities, in which a major axis of a Q phase is 50 nm to 500 nm in a portion in which a maximum stress is generated.

Japanese Unexamined Patent Application Publication No. 2019-123902 (JP 2019-123902 A) discloses a method of manufacturing an aluminum alloy hot forged product made of an aluminum alloy material containing Si: 0.7% to 1.5% by mass, Fe: 0.8% by mass or less, Cu: 0.20% to 0.7% by mass, Mn: 0.20% to 0.7% by mass, Mg: 0.05% to 1.2% by mass, Cr: 0.04% to 0.25% by mass, Zn: 0.30% by mass or less, Ti: 0.15% by mass or less, and a remainder consisting of Al and unavoidable impurities, the method including at least a material heating step of heating the aluminum alloy material under a condition that a heating temperature is 540° C. or higher and 555° C. or lower and a heating time is 2 hours or longer, a first hot forging step of forging the heated aluminum alloy material from a first direction, a second hot forging step of forging the aluminum alloy material after the first hot forging step from a second direction different from the first direction, a quenching step of quenching the aluminum alloy material after the second hot forging step under a condition that a quenching start temperature is 450° C. or higher within 100 seconds after the second hot forging step, and an aging treatment step of performing aging treatment on the aluminum alloy material after the quenching step under a condition that an aging treatment temperature is 180° C. or higher and 200° C. or lower and an aging treatment time is 1 hour or longer.

SUMMARY

An aluminum alloy forged material made of an Al—Mg—Si-based aluminum alloy is often used in an undercarriage component of a vehicle that is requested to be lightweight, and have high strength and high corrosion resistance. An impurity element contained in a material of the aluminum alloy forged material can have a great influence on the corrosion resistance as well as a mechanical property. Therefore, the aluminum alloy forged material that is lightweight, and has high strength and high corrosion resistance is usually manufactured from an aluminum virgin metal manufactured by refining bauxite. However, refining bauxite needs enormous power. In addition, the power is usually supplied by thermal power generation. Therefore, there has been a problem that a large amount of $CO_2$ is emitted due to the manufacture of an aluminum alloy forged material that is lightweight, and has high strength and high corrosion resistance.

Therefore, the present disclosure is to provide means for manufacturing an aluminum alloy forged material having high strength and high corrosion resistance while reducing a usage amount of aluminum virgin metal and reducing a $CO_2$ emission amount.

The present inventors have studied various means for solving the problem described above. The present inventors have found that the aluminum alloy forged material having high strength and high corrosion resistance can be manufactured by using a predetermined amount of the aluminum scrap as a material together with the aluminum virgin metal, adding an additive element to a material mixture, adjusting an elemental composition of the material mixture to a predetermined range, performing heating and melting, and forging, and further performing aging treatment under a predetermined condition. The present inventors have completed the present disclosure based on the findings described above.

That is, the present disclosure includes the following aspects and the following embodiments.

(1) An embodiment of the present disclosure relates to a method of manufacturing an aluminum alloy forged material from a mixture containing an aluminum scrap, an aluminum virgin metal, and at least one additive element selected from the group consisting of Si, Fe, Cu, Ti, Mn, Cr, Zn, and Mg. The mixture contains Si: 0.7% to 1.5% by mass, Fe: 0.8% by mass or less, Cu: 0.20% to 0.7% by mass, Ti: 0.15% by mass or less, Mn: 0.20% to 0.80% by mass, Cr: 0.1% by mass or less, Zn: 0.30% by mass or less, Mg: 0.050% to 1.2% by mass, and a remainder consisting of Al and unavoidable impurities with respect to a total mass of the mixture. A content x of the aluminum scrap in the mixture is in a range of 40% by mass or more and 75% by mass or less with respect to the total mass of the mixture. The method includes the following steps: a heating and melting step of heating and melting the mixture, a forging step of forging the mixture after the heating and melting step, and an aging treatment step of performing aging treatment on a material after the forging step under a condition that an aging temperature and an aging time are as follows:

(aging temperature, aging time)=within a range of a region surrounded by (185, 4), (185, 7), (200, 1), and (200, −2/25x+8).

(2) In the method according to the embodiment (1), the aluminum scrap may be an Al—Mg—Mn-based alloy containing Si: 0.1% to 0.5% by mass, Mg: 1.0% to 2.0% by mass, and Mn: 0.10% to 2.0% by mass with respect to a total mass of the aluminum scrap.

(3) In the method according to the embodiment (2), the aluminum scrap may be an aluminum can.

According to the present disclosure, it is possible to provide means for manufacturing an aluminum alloy forged material having high strength and high corrosion resistance while reducing a usage amount of aluminum virgin metal and reducing the $CO_2$ emission amount.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
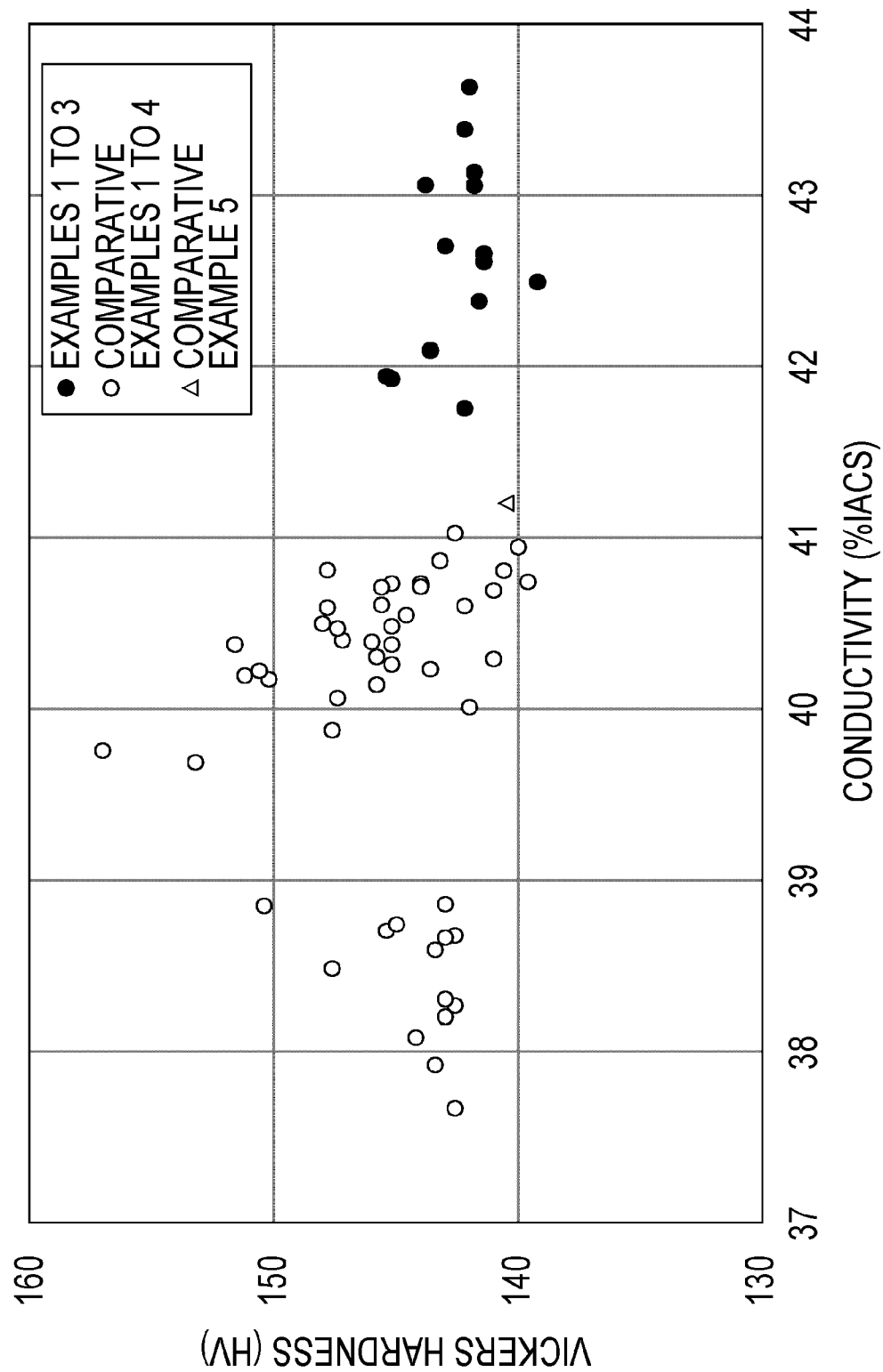
FIG. 1 is a graph showing a relationship between conductivity and Vickers hardness of aluminum alloy forged materials of Examples 1 to 3 and Comparative Examples 1 to 5, in which a horizontal axis is relative conductivity (% IACS) in a case where the conductivity of international annealed copper standard (resistivity: $1.7241 \times 10^{-8}$ $\Omega$m) is defined as 100%, and a vertical axis is the Vickers hardness (HV)

In the following, preferred embodiments of the present disclosure will be described in detail.

1. Method of Manufacturing Aluminum Alloy Forged Material

An aluminum alloy forged material made of an Al—Mg—Si-based aluminum alloy is often used in an undercarriage component, such as an upper arm and a lower arm, of a vehicle that is requested to be lightweight, and have high strength and high corrosion resistance. An impurity element contained in a material of the aluminum alloy forged material can have a great influence on the corrosion resistance as well as a mechanical property. Therefore, the aluminum alloy forged material that is lightweight, and has high strength and high corrosion resistance is usually manufactured from an aluminum virgin metal manufactured by a step of refining alumina from bauxite (Bayer process) and a step of refining pure aluminum from alumina (Hall-Héroult process). However, refining bauxite, particularly electrolytic refining by the Hall-Héroult process, needs enormous power. In addition, the power is usually supplied by thermal power generation. Therefore, in a case where the aluminum alloy forged material is manufactured from the aluminum virgin metal, there is a problem that a large amount of $CO_2$ is emitted.

The present inventors have found that the aluminum alloy forged material having high strength and high corrosion resistance can be manufactured by using a predetermined amount of the aluminum scrap as a material together with the aluminum virgin metal, adding an additive element to a material mixture, adjusting an elemental composition of the material mixture to a predetermined range, performing heating and melting, and forging, and further performing aging treatment under a predetermined condition. Therefore, one aspect of the present disclosure relates to a method of manufacturing an aluminum alloy forged material.

The method according to the present aspect is the method of manufacturing the aluminum alloy forged material from the mixture containing the aluminum scrap, the aluminum virgin metal, and at least one additive element selected from the group consisting of Si, Fe, Cu, Ti, Mn, Cr, Zn, and Mg. A content x of the aluminum scrap in the mixture is usually in a range of 40% by mass or more and 75% by mass or less, particularly in a range of 50% by mass or more and 75% by mass or less, with respect to a total mass of the mixture. For example, in a case of an aluminum alloy in the related art, such as an AA6110 alloy consisting solely of the aluminum virgin metal, in order to manufacture 1 kg of the aluminum alloy forged material, about 10 kg of $CO_2$ is emitted. On the other hand, in a case of the content of the aluminum scrap is 50% by mass, a content of the aluminum virgin metal is 50% by mass, and thus the $CO_2$ emission amount when 1 kg of the aluminum alloy forged material is manufactured is reduced to about 5 kg. In addition, as shown in the following examples, even in a case where the material mixture containing the aluminum scrap with the content in the range described above is used, it is possible to obtain the aluminum alloy forged material having the strength and the corrosion resistance that are substantially the same as the strength and the corrosion resistance in a case of using the material mixture consisting solely of the aluminum virgin metal by performing the method according to the present aspect. Therefore, by performing the method according to the present aspect by using the material mixture containing the aluminum scrap with the content in the range described above, it is possible to manufacture the aluminum alloy forged material having high strength and high corrosion resistance while reducing the $CO_2$ emission amount.

In each aspect of the present disclosure, the aluminum scrap means a recycled material containing aluminum. It is preferable that the aluminum scrap be an Al—Mg—Mn-based alloy containing Si: 0.1% to 0.5% by mass, Mg: 1.0% to 2.0% by mass, and Mn: 0.10% to 2.0% by mass with respect to the total mass of the aluminum scrap, and more preferable that the aluminum scrap be an Al—Mg—Mn-based alloy containing Si: 0.1% to 0.3% by mass, Mg: 1.3% to 1.6% by mass, and Mn: 0.10% to 1.5% by mass with respect to the total mass of the aluminum scrap. It is preferable that the aluminum scrap be an aluminum can or an Al—Mg-based alloy end material (for example, an end material of a material used for a ship or the like), and more preferable that the aluminum scrap be an aluminum can. By performing the method according to the present aspect by using the material mixture containing the aluminum scrap having the characteristics described above, it is possible to reduce $CO_2$ emission amount as compared with a case of using the material mixture consisting solely of the aluminum virgin metal.

In each aspect of the present disclosure, the aluminum virgin metal means aluminum or an aluminum alloy material manufactured by refining bauxite. Examples of the aluminum virgin metal include a 6000-based (Al—Mg—Si-based) aluminum alloy that is lightweight, and has high strength and high corrosion resistance. It is preferable that the aluminum virgin metal be the 6000-based (Al—Mg—Si-based) aluminum alloy, such as an AA6110 alloy, an AA6061 alloy, or an AA6082 alloy. By performing the method according to the present aspect by using the material mixture containing the aluminum virgin metal having the characteristics described above, it is possible to manufacture the aluminum alloy forged material having high strength and high corrosion resistance.

In the method according to the present aspect, the material mixture contains Si: 0.7% to 1.5% by mass, Fe: 0.8% by mass or less, Cu: 0.20% to 0.7% by mass, Ti: 0.15% by mass or less, Mn: 0.20% to 0.80% by mass, Cr: 0.1% by mass or less, Zn: 0.30% by mass or less, Mg: 0.050% to 1.2% by mass, and a remainder consisting of Al and unavoidable impurities with respect to the total mass of the mixture. It is preferable that the material mixture contain Si: 0.9% to 1.3% by mass, Fe: 0.35% by mass or less, Cu: 0.4% to 0.75% by mass, Ti: 0.15% by mass or less, Mn: 0.40% to 0.80% by mass, Cr: 0.1% by mass or less, Zn: 0.15% by mass or less, Mg: 0.8% to 1.2% by mass, and a remainder consisting of Al and unavoidable impurities with respect to the total mass of the mixture. An elemental composition described above is substantially the same as an elemental composition of the aluminum alloy in the related art, such as the AA6110 alloy consisting solely of the aluminum virgin metal excluding Cr. Therefore, it is possible to obtain the aluminum alloy forged material having the strength and the corrosion resistance that are substantially the same as the strength and the corrosion resistance in a case of using the material mixture consisting solely of the aluminum virgin metal by performing the method according to the present aspect by using the material mixture adjusted to the elemental composition in the range described above by the additive element.

In the method according to the present aspect, the additive element means an elemental component added to the material mixture in order to adjust the elemental composition of the material mixture to a predetermined range. The additive element is usually at least one selected from the group consisting of Si, Fe, Cu, Ti, Mn, Cr, Zn, and Mg. As described above, the aluminum scrap has a low content of Si and a high content of Mg as compared with the aluminum virgin metal. Therefore, it is possible to obtain the aluminum alloy forged material having the strength and the corrosion resistance that are substantially the same as the strength and the corrosion resistance in a case of using the material mixture consisting solely of the aluminum virgin metal by performing the method according to the present aspect by using the material mixture adjusted to the elemental composition in the range described above by the additive element described above.

The method according to the present aspect includes a heating and melting step, a forging step, and an aging treatment step. In the following, each step of the method according to the present aspect will be described.

1-1. Heating and Melting Step

The present step includes heating and melting the material mixture described above.

The present step can be performed by using means usually used in the technical field, such as an electric furnace.

In the present step, a heating temperature and a heating time of the material mixture are not particularly limited as long as the temperature and the time are within a range used for heating and melting the material mixture of the aluminum alloy in the technical field. In a case where the heating temperature is lower than a usually used temperature, there is a possibility that the solid solution of the element in the material mixture is insufficient. In a case where the heating temperature exceeds the usually used temperature, there is a possibility that a crack occurs during the forging step described below. In addition, in a case where the heating time is shorter than a usually used time, there is a possibility that the solid solution of the element in the material mixture is insufficient. Therefore, by performing the present step under a condition used for heating and melting the material mixture of the aluminum alloy in the technical field, the element in the material mixture can be sufficiently solid-solved.

1-2. Forging Step

The present step includes forging the mixture after the heating and melting step.

The present step can be performed by using means usually used in the technical field, such as an oil pressure, a water pressure, or a hammer press.

In the present step, a forging temperature of the mixture is preferably in a range of 520° C. to 560° C., and more preferably in a range of 540° C. to 555° C. In addition, the number of times of forging of the mixture is preferably 2 times or more, and more preferably 3 times or more. It is preferable that the present step be performed continuously at the forging temperature and the number of times of forging in the range described above. In a case where the forging temperature is lower than the lower limit value, there is a possibility that the strength of the resulting aluminum alloy forged material is insufficient. In a case where the forging temperature exceeds the upper limit value, there is a possibility that a crack occurs. In addition, the number of times of forging is less than the lower limit value, there is a possibility that the strength of the resulting aluminum alloy forged material is insufficient. Therefore, by performing the present step under the condition described above, it is possible to obtain the aluminum alloy forged material having high strength.

In the present step, quenching (forging quenching) may be performed immediately after forging (hot forging) of the mixture is performed under the condition described above.

By performing forging quenching, it is possible to further improve the strength of the aluminum alloy forged material.

1-3. Solution Treatment Step

The method according to the present aspect may optionally include a solution treatment step of heating and cooling the material after the forging step.

The present step can be performed by using means usually used in the technical field, such as the electric furnace and a coolant tank.

In the present step, a heating temperature of the solution treatment is preferably in a range of 530° C. to 560° C., and more preferably in a range of 540° C. to 555° C. A heating time of the solution treatment is preferably 1 hour or longer, and more preferably 2 hours or longer. In addition, a quenching coolant temperature of the solution treatment is preferably in a range of 25° C. to 60° C., and more preferably in a range of 35° C. to 55° C. In a case where the quenching coolant temperature exceeds the upper limit value, there is a possibility that the solution of the element in the material is insufficient. In a case where the quenching coolant temperature is lower than the lower limit value, there is a possibility that quenching strain has a great influence on a product dimension. In a case where the heating time is shorter than the lower limit value, there is a possibility that the solution of the element in the material is insufficient. Therefore, by performing the present step under the condition described above, it is possible to achieve sufficient solution of the element in the material.

1-4. Aging Treatment Step

The present step includes performing the aging treatment on the material after the forging step.

The present step can be performed by using means usually used in the technical field, such as the electric furnace.

In the present step, the material after the forging step is subjected to aging treatment under a condition that an aging temperature and an aging time are as follows:

(aging temperature, aging time)=within a range of a region surrounded by (185, 4), (185, 7), (200, 1), and (200, −2/25x+8), it has been found that the strength and the corrosion resistance of the resulting aluminum alloy forged material can be improved.

Figure 3A:
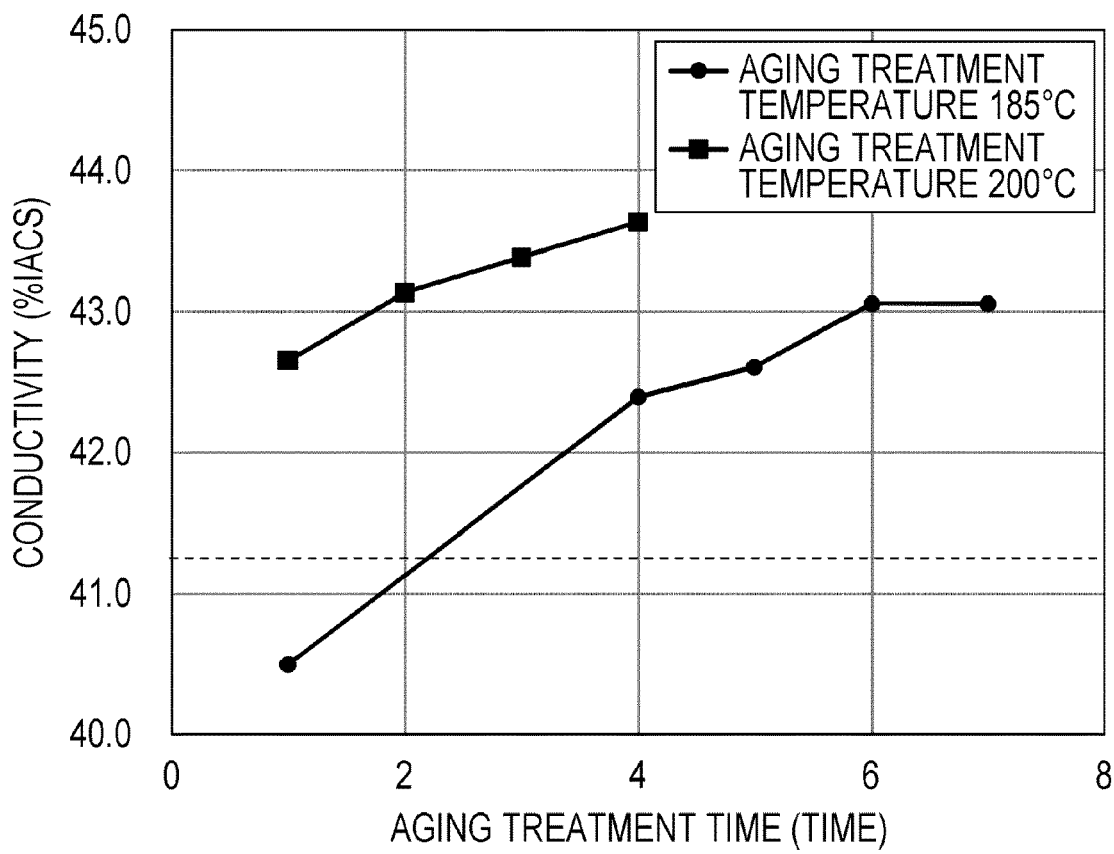
FIG. 3A is a graph showing a relationship between an aging treatment time and the conductivity at the time of manufacture in the aluminum alloy forged materials of Example 2, in which a horizontal axis is the aging treatment time (time), a vertical axis is the conductivity (% IACS), a dotted line indicates the conductivity (41.2% IACS) of Comparative Example 5.
Figure 3B:
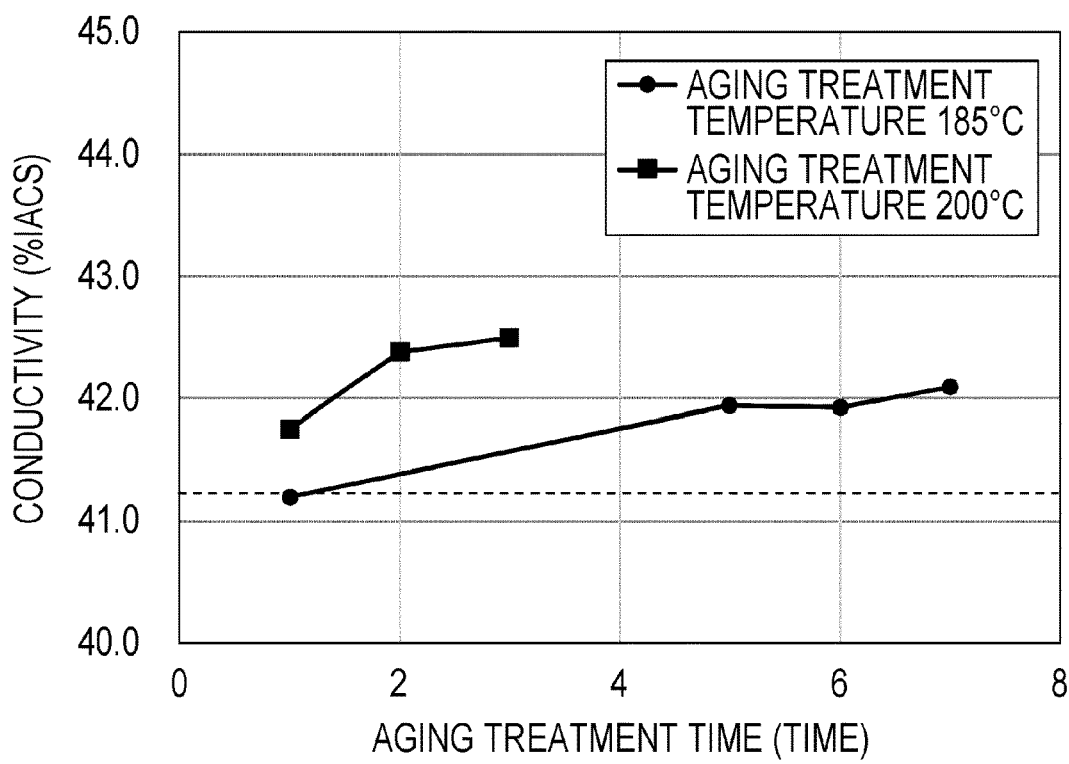
FIG. 3B is a graph showing a relationship between an aging treatment time and the conductivity at the time of manufacture in the aluminum alloy forged materials of Example 3, in which a horizontal axis is the aging treatment time (time), a vertical axis is the conductivity (% IACS), a dotted line indicates the conductivity (41.2% IACS) of Comparative Example 5.
Figure 4A:
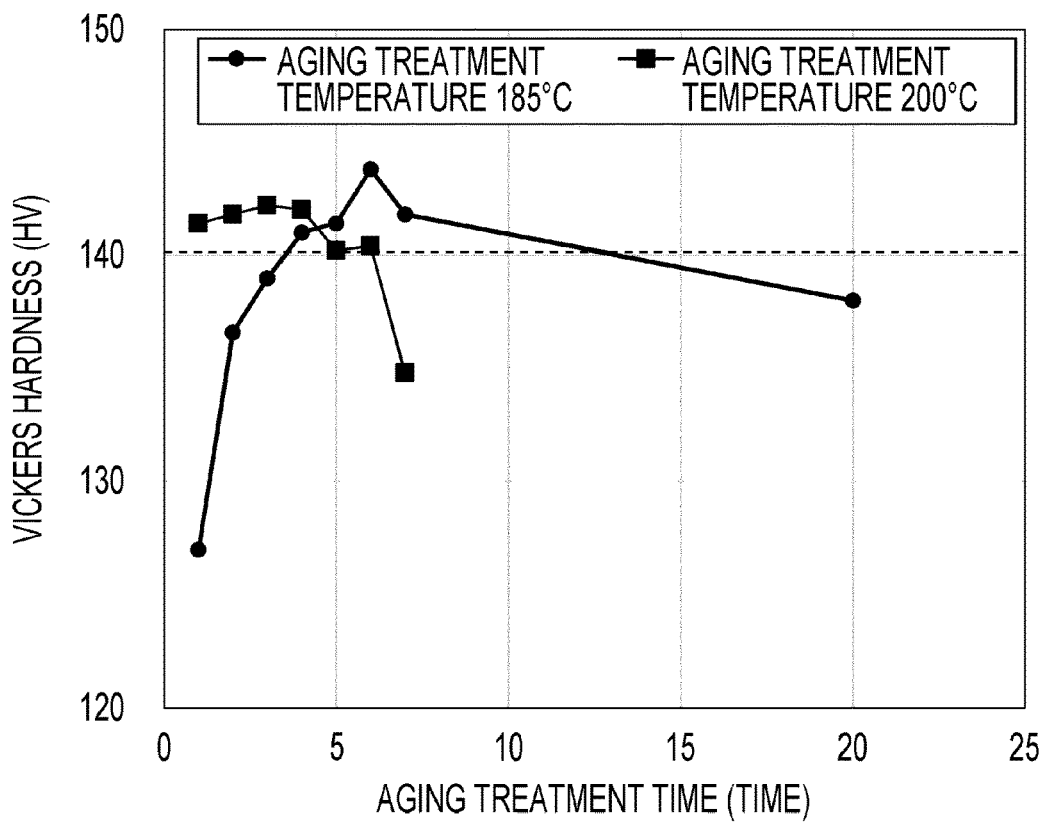
FIG. 4A is a graph showing a relationship between the aging treatment time and the hardness at the time of manufacture in the aluminum alloy forged materials of Example 2, in which a horizontal axis is the aging treatment time (time), and a vertical axis is the Vickers hardness (HV), a dotted line indicates the Vickers hardness (140.5 HV) of Comparative Example 5.
Figure 4B:
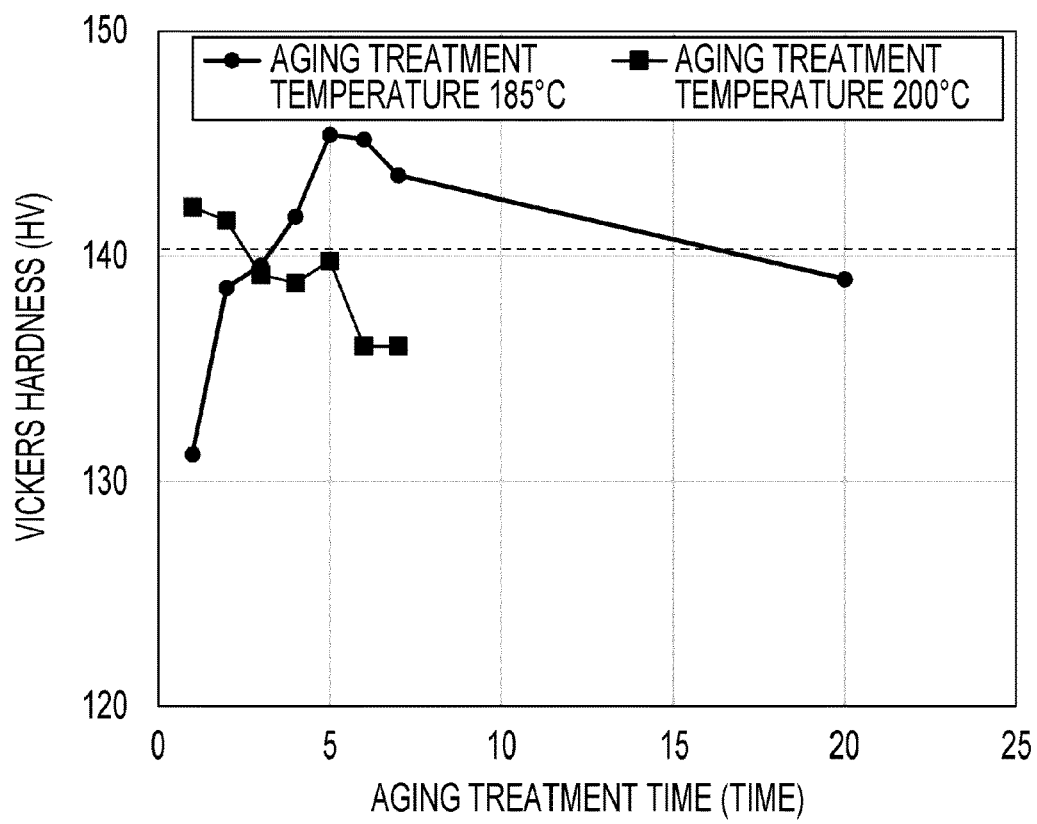
FIG. 4B is a graph showing a relationship between the aging treatment time and the hardness at the time of manufacture in the aluminum alloy forged materials of Example 3, in which a horizontal axis is the aging treatment time (time), and a vertical axis is the Vickers hardness (HV), a dotted line indicates the Vickers hardness (140.5 HV) of Comparative Example 5.

Here, x is the content (% by mass) of the aluminum scrap in the material mixture. The reason for exerting the operations and effects described above in each aspect of the present disclosure can be described as follows. It should be noted that each aspect of the present disclosure is not limited to the following operations and principles. In the aging treatment of the aluminum alloy forged material, in a case where an aging treatment temperature is fixed, the conductivity of the resulting aluminum alloy forged material is increased as the aging treatment time is increased (FIGS. 3A and 3B). On the other hand, the hardness of the resulting aluminum alloy forged material is gradually decreased when the aging treatment time exceeds a certain length (FIGS. 4A and 4B). In addition, in the aging treatment of the aluminum alloy forged material, in a case where the aging treatment temperature is fixed, a diffusion rate of the element contained in the alloy is the same. Therefore, it can be assumed that the hardness, that is, the strength of the resulting aluminum alloy forged material is rate-determined by an amount of precipitates that are compounds of Mg and Si. Here, the precipitate precipitates Mn derived from the aluminum scrap (for example, the aluminum can) as a nucleation site. Therefore, it is possible to obtain the aluminum alloy forged material having high strength and high corrosion resistance performing the aging treatment under the condition described above defined based on the content x of the aluminum scrap. In the present step, for example, in a case where the content x of the aluminum scrap is 50% by mass, it is preferable that the material after the forging step is subjected to the aging treatment under a condition that the aging temperature and the aging time are as follows:

(aging temperature, aging time)=within a range of a region surrounded by (185, 4), (185, 7), (200, 1), and (200, 4), and it is more preferable that the aging treatment be performed under a condition that the aging treatment temperature is 185° C. and the aging treatment time is in a range of 4 hours to 7 hours, or under a condition that the aging treatment temperature is 200° C. and the aging treatment time is in a range of 1 hour to 4 hours. For example, in a case where the content x of the aluminum scrap is 75% by mass, it is preferable that the material after the forging step is subjected to the aging treatment under a condition that the aging temperature and the aging time are as follows:

(aging temperature, aging time)=within a range of a region surrounded by (185, 4), (185, 7), (200, 1), and (200, 2), and it is more preferable that the aging treatment be performed under a condition that the aging treatment temperature is 185° C. and the aging treatment time is in a range of 4 hours to 7 hours, or under a condition that the aging treatment temperature is 200° C. and the aging treatment time is in a range of 1 hour to 2 hours. In a case where the aging treatment time exceeds the range described above in the present step, there is a possibility that the strength of the resulting aluminum alloy forged material is decreased due to so-called over-aging. Therefore, by performing the present step under the condition described above, it is possible to obtain the aluminum alloy forged material having high strength and high corrosion resistance.

2. Aluminum Alloy Forged Material

As described above, the aluminum alloy forged material having high strength and high corrosion resistance can be obtained by the manufacturing method according to one aspect of the present disclosure. Therefore, another aspect of the present disclosure relates to an aluminum alloy forged material that can be obtained by the manufacturing method according to one aspect of the present disclosure, preferably an aluminum alloy forged material that is obtained by the method.

In each aspect of the present disclosure, the strength of the aluminum alloy forged material is not limited, but can be evaluated by using, for example, the hardness of the aluminum alloy forged material as an index. The hardness of the aluminum alloy forged material can be measured, for example, as Vickers hardness (HV) by using a Vickers hardness tester based on JIS Z2244: 2009. It is known that in the aluminum alloy forged material, the strength and the hardness have a certain correlation. Therefore, the strength of the forged material can be evaluated by measuring the hardness of the aluminum alloy forged material.

In each aspect of the present disclosure, the corrosion resistance of the aluminum alloy forged material is not limited, but can be evaluated by using, for example, the conductivity of the aluminum alloy forged material as an index. The conductivity of the aluminum alloy forged material can be measured as relative conductivity (% IACS) in a case where the conductivity of international annealed copper standard (resistivity: $1.7241 \times 10^{-8}$ Ωm) is defined as 100% by using a high-precision conductivity measuring instrument or the like. It is known that in the aluminum alloy forged material, the corrosion resistance and the conductivity have a certain correlation. Therefore, the corrosion resistance of the forged material can be evaluated by measuring the conductivity of the aluminum alloy forged material.

The aluminum alloy forged material according to the present aspect usually has the Vickers hardness of 135 HV or more, for example 140 HV or more, particularly in a range of 140 HV to 150 HV. In addition, the aluminum alloy forged material according to the present aspect usually has the conductivity of 41% IACS or more, for example, 41.5% IACS or more, particularly in a range of 41.5% IACS to 44% IACS. On the other hand, the aluminum alloy forged material obtained from the aluminum alloy in the related art, such as the AA6110 alloy, has the Vickers hardness of about 140 HV and the conductivity of about 41% IACS. Therefore, the aluminum alloy forged material according to the present aspect can have high strength and high corrosion resistance that are the same as or exceeds the strength and the corrosion resistance of the aluminum alloy forged material obtained by the aluminum alloy in the related art.

Since the aluminum alloy forged material according to the present aspect is lightweight, and has high strength and high corrosion resistance, the aluminum alloy forged material can be used as a structural member of a vehicle by appropriately performing extruding and/or forging. Examples of the structural member of the vehicle include an undercarriage component of the vehicle, such as an upper arm, a lower arm, and a steering knuckle carrier, an energy absorbing member that absorbs energy at the time of collision, such as bumper reinforcement and door impact beam. By using the aluminum alloy forged material according to the present aspect as the structural member of the vehicle described above, it is possible to achieve the weight reduction of the vehicle, and improving of the steering stability and comfort of the vehicle.

In the following, the present disclosure will be described in more detail with reference to Examples. It should be noted that the technical scope of the present disclosure is not limited to Examples.

I: Manufacture of Aluminum Alloy Forged Material

I-1: Material Composition

Table 1 shows material compositions of the aluminum alloy forged materials of Examples and Comparative Examples. The elemental compositions and the material compositions in the table are shown in % by mass with respect to the total mass of the material mixture.

I-2: Manufacture

After the materials of Examples and Comparative Examples are adjusted to the compositions shown in Table 1, the material mixtures were heated and melted at a temperature of 700° C. or higher and subjected to continuously casting. The materials of Examples and Comparative Examples were subjected to forging under a condition of 555° C. Then, the materials of Examples and Comparative Examples were subjected to T6 treatment under various conditions shown below.

Solution treatment: the material mixture was heated at 555° C. for 2 hours and then coolant-cooled.

Aging treatment: the material after the solution treatment was subjected to aging treatment at 170° C. to 200° C. for 1 hour to 10 hours.

II: Performance Evaluation of Aluminum Alloy Forged Material

II-1: Relationship between Conductivity and Hardness

The conductivity and the Vickers hardness of each of the aluminum alloy forged materials of Examples and Comparative Examples were measured. The conductivity of the forged material was measured by using the high-precision conductivity measuring instrument. In addition, the Vickers hardness of the forged material was measured by using the Vickers hardness tester based on JIS Z2244: 2009.

FIG. 1 shows a relationship between the conductivity and the Vickers hardness of each of the aluminum alloy forged materials of Examples 1 to 3 and Comparative Examples 1 to 5. In FIG. 1, a horizontal axis is the relative conductivity (% IACS) in a case where the conductivity of international annealed copper standard (resistivity: $1.724 \times 10^{-8}$ $\Omega$m) is defined as 100%, and a vertical axis is the Vickers hardness (HV). As shown in FIG. 1, Comparative Examples 1 to 4 had the hardness that is almost the same as or exceeds the hardness of Comparative Example 5 that is the aluminum alloy in the related art (AA6110 alloy), but had the conductivity lower than the conductivity of Comparative Example 5. Therefore, there is a possibility that the aluminum alloy forged materials of Comparative Examples 1 to 4 have high strength, but have low corrosion resistance. On the other hand, Examples 1 to 3 had the hardness that is almost the same as or exceeds the hardness of Comparative Example 5, and had the conductivity higher than the conductivity of Comparative Example 5. Therefore, it is presumed that the

TABLE 1

| Sample | | Elemental composition (% by mass) of material mixture | | | | | | | | | Material composition (% by mass) of material mixture | | Note |
|---|---|---|---|---|---|---|---|---|---|---|---|---|---|
| | | Si | Fe | Cu | Ti | Mn | Cr | Zn | Mg | Al | Aluminum can | Aluminum virgin metal addictive element | |
| Example | 1 | 1.1 | 0.17 | 0.45 | 0.02 | 0.43 | 0.01 | 0.05 | 0.92 | Remainder | 40 | 60 | |
| | 2 | 1.1 | 0.23 | 0.44 | 0.02 | 0.44 | 0.01 | 0.08 | 0.92 | Remainder | 50 | 50 | |
| | 3 | 1.1 | 0.34 | 0.45 | 0.02 | 0.71 | 0.02 | 0.1 | 0.93 | Remainder | 75 | 25 | |
| Comparative Example | 1 | 1.3 | 0.48 | 0.45 | 0.05 | 0.87 | 0.03 | 0.13 | 1.2 | Remainder | 100 | 0 | |
| | 2 | 1.9 | 0.4 | 0.45 | 0.02 | 0.88 | 0.02 | 0.11 | 1.3 | Remainder | 100 | 0 | Add Si |
| | 3 | 1.2 | 0.4 | 0.73 | 0.02 | 0.9 | 0.02 | <0.05 | 1.3 | Remainder | 100 | 0 | Add Cu |
| | 4 | 0.88 | 0.47 | 0.74 | 0.02 | 0.93 | 0.02 | 0.1 | 1.2 | Remainder | 100 | 0 | Reduce Si |
| | 5 | 1.1 | 0.22 | 0.46 | 0.02 | 0.46 | 0.12 | 0.01 | 1 | Remainder | 0 | 100 | AA6110 alloy | aluminum alloy forged materials of Examples 1 to 3 have high strength and high corrosion resistance.

II-2: Relationship between Aluminum Can Compounding Ratio and Conductivity

Figure 2:
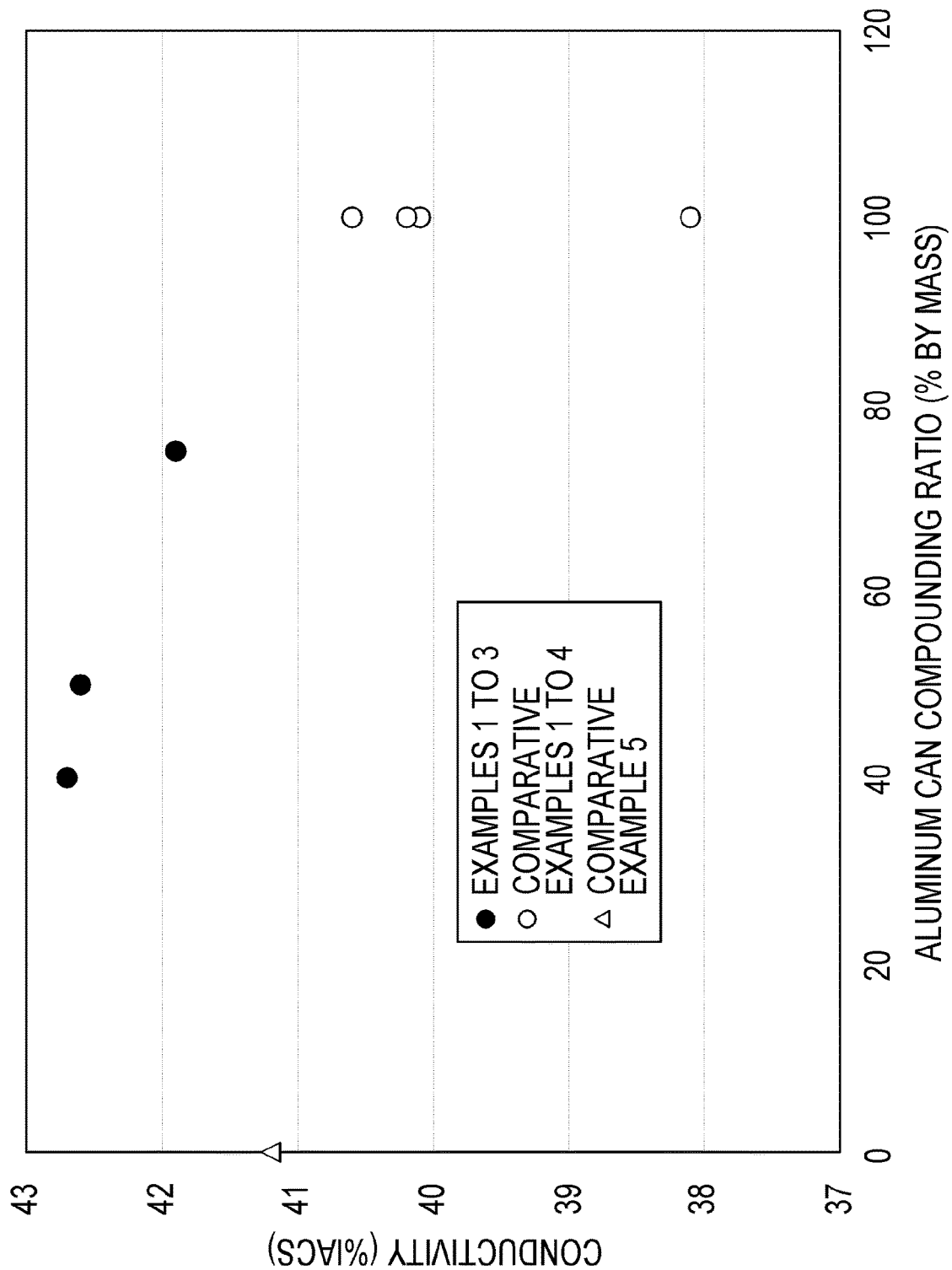
FIG. 2 is a graph showing a relationship between an aluminum can compounding ratio and the conductivity in the aluminum alloy forged materials of Examples 1 to 3 and Comparative Examples 1 to 5 that are subjected to aging treatment under the same aging treatment condition (185° C., 5 hours), in which a horizontal axis is the aluminum can compounding ratio (% by mass), and a vertical axis is the conductivity (% IACS)

FIG. 2 shows a relationship between an aluminum can compounding ratio and the conductivity in the aluminum alloy forged materials of Examples 1 to 3 and Comparative Examples 1 to 5 that are subjected to the aging treatment under the same aging treatment condition (185° C., 5 hours). In FIG. 2, a horizontal axis is the aluminum can compounding ratio (% by mass), and a vertical axis is the conductivity (% IACS). As shown in FIG. 2, it was clear that the aluminum can compounding ratio should be 75% by mass or less (Examples 1 to 3) in order to obtain the conductivity exceeding the conductivity (41.2% IACS) of Comparative Example 5 that is the aluminum alloy (AA6110 alloy) in the related art. In the present example, in order to secure an amount of precipitation hardening, the aluminum can was compounded to the material mixture, and then elemental component was added to have the elemental composition similar to the elemental composition of the AA6110 alloy (excluding a Cr composition). Therefore, even in a case where the aluminum can compounding ratio was reduced as compared with Example 1, the conductivity was hardly changed (result is not shown). However, from a viewpoint of reducing the $CO_2$ emission amount at the time of manufacture, it is preferable that the aluminum can compounding ratio be high. For example, in a case of the aluminum alloy in the related art, such as the AA6110 alloy consisting solely of the aluminum virgin metal, in order to manufacture 1 kg of the aluminum alloy forged material, about 10 kg of $CO_2$ is emitted. On the other hand, in a case of the aluminum can compounding ratio is 50% by mass, a compounding ratio of the aluminum virgin metal is 50% by mass, and thus the $CO_2$ emission amount when 1 kg of the aluminum alloy forged material is manufactured is reduced to about 5 kg. Therefore, in the present example, by setting the aluminum can compounding ratio to 40% by mass or more, it is possible to have high conductivity while reducing the $CO_2$ emission amount.

II-3: Relationship Between Aging Treatment Condition and Conductivity

In the aluminum alloy forged materials of Examples 2 and 3, the relationship between the aging treatment time and the conductivity at the time of manufacture is shown in FIGS. 3A and 3B. FIG. 3A is a result of Example 2 and FIG. 3B is a result of Example 3. In FIGS. 3A and 3B, a horizontal axis is the aging treatment time (time), and a vertical axis is the conductivity (% IACS). In addition, a dotted line in FIGS. 3A and 3B indicates the conductivity (41.2% IACS) of Comparative Example 5. As shown in FIGS. 3A and 3B, the conductivity of the aluminum alloy forged material improved with the aging treatment time at the time of manufacture. In a case of the aluminum alloy forged material of Example 2, in order to obtain the conductivity exceeding the conductivity (41.2% IACS) of Comparative Example 5 that is the aluminum alloy (AA6110 alloy) in the related art, the aging treatment of 4 hours or longer was needed at the aging treatment temperature 185° C., and the aging treatment of 1 hour or longer was needed at the aging treatment temperature 200° C. (FIG. 3A). On the other hand, in a case of the aluminum alloy forged material of Example 3, in order to obtain the conductivity exceeding the conductivity (41.2% IACS) of Comparative Example 5 that is the aluminum alloy (AA6110 alloy) in the related art, the aging treatment of 1 hours or longer was needed at both the aging treatment temperatures 185° C. and 200° C. (FIG. 3B). In a case of the aluminum alloy forged material of Example 1, since the aluminum can compounding ratio was almost the same as the aluminum can compounding ratio of Example 2, a result was almost the same as the result of Example 2 (result is not shown).

II-4: Relationship Between Aging Treatment Condition and Hardness

In the aluminum alloy forged materials of Examples 2 and 3, the relationship between the aging treatment time and the hardness at the time of manufacture is shown in FIGS. 4A and 4B. FIG. 4A is a result of Example 2 and FIG. 4B is a result of Example 3. In FIGS. 4A and 4B, a horizontal axis is the aging treatment time (time), and a vertical axis is the Vickers hardness (HV). In addition, a dotted line in FIGS. 4A and 4B indicates the Vickers hardness (140.5 HV) of Comparative Example 5. As shown in FIGS. 4A and 4B, the hardness of the aluminum alloy forged material was decreased with the aging treatment time at the time of manufacture due to the so-called over-aging. In a case of the aluminum alloy forged material of Example 2, in order to obtain the hardness exceeding the Vickers hardness (140.5 HV) of Comparative Example 5 that is the aluminum alloy (AA6110 alloy) in the related art, the aging treatment in a range of 4 hours to 7 hours was needed at the aging treatment temperature 185° C., and the aging treatment in a range of 1 hour to 4 hours was needed at the aging treatment temperature 200° C. (FIG. 4A). On the other hand, in a case of the aluminum alloy forged material of Example 3, in order to obtain the hardness exceeding the Vickers hardness (140.5 HV) of Comparative Example 5 that is the aluminum alloy (AA6110 alloy) in the related art, the aging treatment in a range of 4 hours to 7 hours was needed at the aging treatment temperature 185° C., and the aging treatment in a range of 1 hour to 2 hours was needed at the aging treatment temperature 200° C. (FIG. 4B).

Figure 5:
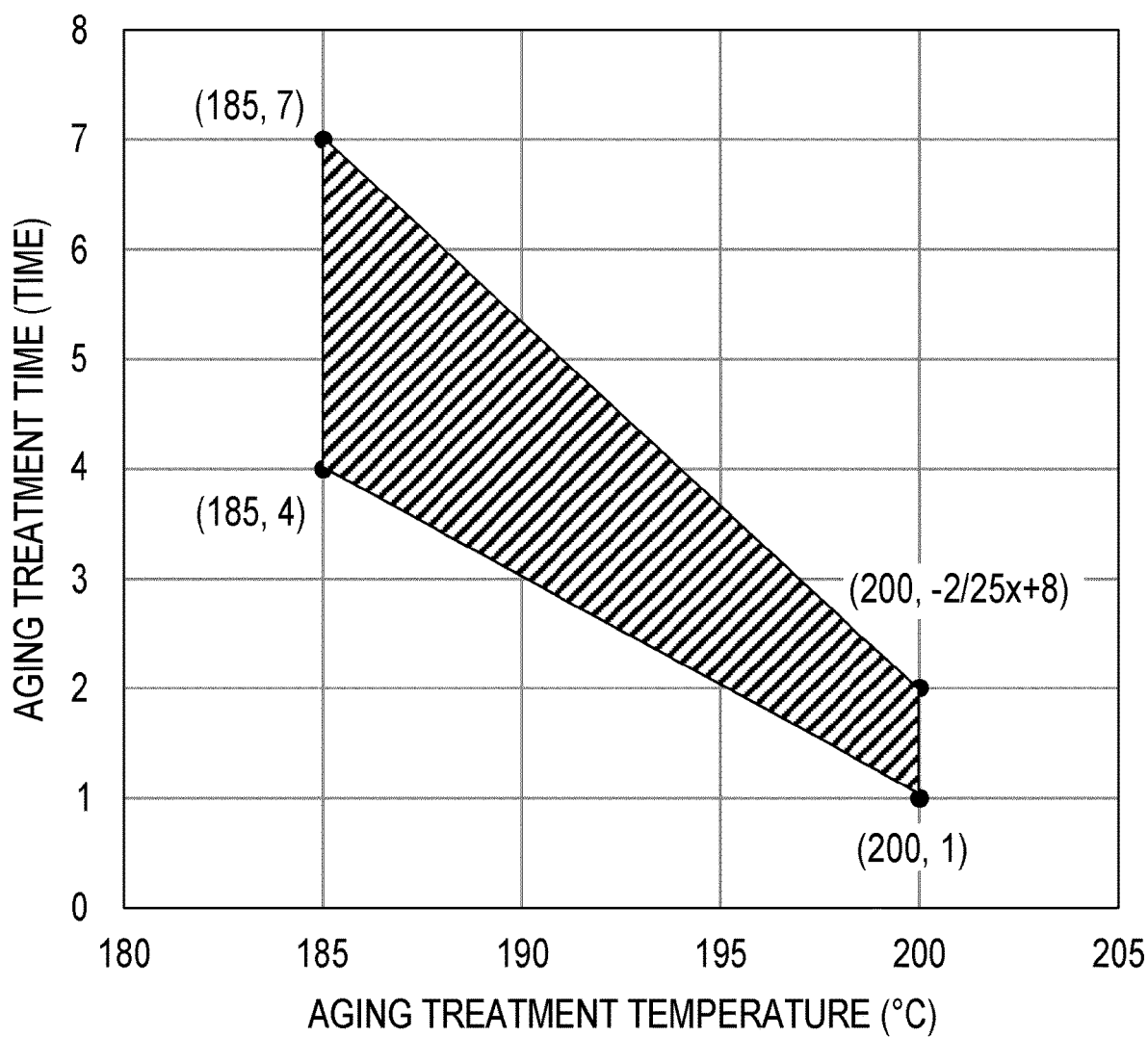
FIG. 5 is a graph showing an aging treatment condition for obtaining high hardness and conductivity decided based on the relationship between the aging treatment condition, the hardness, and the conductivity at the time of manufacture in the aluminum alloy forged materials of Examples 1 to 3, in which a horizontal axis is an aging treatment temperature (° C.), and a vertical axis is the aging treatment time (time).

II-5: Aging Treatment Condition for Manufacturing Aluminum Alloy Forged Material Having High Strength and High Corrosion Resistance FIG. 5 shows the aging treatment condition for obtaining high hardness and conductivity decided based on the relationship between the aging treatment condition, the hardness, and the conductivity at the time of manufacture in the aluminum alloy forged materials of Examples 1 to 3. In FIG. 5, a horizontal axis is the aging treatment temperature (° C.), and a vertical axis is the aging treatment time (time).

In the aging treatment of the aluminum alloy forged material, in a case where the aging treatment temperature is fixed, the conductivity of the resulting aluminum alloy forged material is increased as the aging treatment time is increased (FIGS. 3A and 3B).

On the other hand, the hardness of the resulting aluminum alloy forged material is gradually decreased when the aging treatment time exceeds a certain length (FIGS. 4A and 4B). In addition, in the aging treatment of the aluminum alloy forged material, in a case where the aging treatment temperature is fixed, the diffusion rate of the element contained in the alloy is the same. Therefore, it can be assumed that the hardness, that is, the strength of the resulting aluminum alloy forged material is rate-determined by the amount of precipitates that are compounds of Mg and Si. Here, the precipitate precipitates Mn derived from the aluminum scrap (aluminum can) as the nucleation site. Therefore, it is possible to obtain the aluminum alloy forged material having high strength and high corrosion resistance by performing the aging treatment under the condition defined based on the content x (% by mass) of the aluminum scrap with respect to the total mass of the material mixture, and the condition is as follows:

(aging temperature, aging time)=within a range of a region (shaded region in FIG. 5) surrounded by (185, 4), (185, 7), (200, 1), and (200, −2/25x+8).

It should be noted that the present disclosure is not limited to examples described above, and includes various modification examples. For example, examples described above have been described in detail in order to describe the present disclosure in an easy-to-understand manner, and the present disclosure is not always limited to the examples having all the configurations described above. In addition, it is possible to add, delete, and/or replace a part of the configurations of each example with other configurations.

What is claimed is:

1. A method of manufacturing an aluminum alloy forged material from a mixture containing an aluminum scrap, an aluminum virgin metal, and at least one additive element selected from the group consisting of Si, Fe, Cu, Ti, Mn, Cr, Zn, and Mg, wherein:
    the mixture contains Si: 0.7% to 1.3% by mass, Fe: 0.8% by mass or less, Cu: 0.20% to 0.7% by mass, Ti: 0.15% by mass or less, Mn: 0.20% to 0.80% by mass, Cr: 0.1% by mass or less, Zn: 0.30% by mass or less, Mg: 0.050% to 1.2% by mass, and a remainder consisting of Al and unavoidable impurities with respect to a total mass of the mixture;
    a content x of the aluminum scrap in the mixture is in a range of 40% by mass or more and 75% by mass or less with respect to the total mass of the mixture; and
    the method comprises the following steps:
        a heating and melting step of heating and melting the mixture;
        a forging step of forging the mixture after the heating and melting step; and
        an aging treatment step of performing aging treatment on a material after the forging step under a condition that an aging temperature and an aging time are as follows:
            (aging temperature, aging time)=within a range of a region surrounded by (185° C., 4 hr.), (185° C., 7 hr.), (200° ° C., 1 hr.), and (200° C., −2/25x+8 hr.) where x is mass % of the aluminum scrap in the mixture.

2. The method according to claim 1, wherein the aluminum scrap is an Al—Mg—Mn-based alloy containing Si: 0.1% to 0.5% by mass, Mg: 1.0% to 2.0% by mass, and Mn: 0.10% to 2.0% by mass with respect to a total mass of the aluminum scrap.

3. The method according to claim 2, wherein the aluminum scrap is an aluminum can.

4. The method according to claim 1, wherein the aluminum alloy forged material has a Vickers hardness of 135 HV to 150 HV and a conductivity of 41% IACS (international annealed copper standard) to 44% IACS.

5. The method according to claim 1, wherein said mixture includes Si in an amount of 0.9% by mass to 1.3% by mass.

6. The method according to claim 1, wherein the aluminum alloy forged material is a bumper reinforcement or a door impact beam.

7. The method according to claim 1, wherein said mixture includes Si in an amount of 0.7% to 1.1% by mass.

8. The method according to claim 1, wherein said mixture includes Si in an amount of 0.9% to 1.1% by mass.

9. The method according to claim 1, wherein said mixture contains 1.1% by mass Si, 0.17% to 0.34% by mass Fe, 0.44% to 0.45% by mass Cu, 0.02% by mass Ti, 0.43% to 0.71% by mass Mn, 0.01% to 0.02% by mass Cr, 0.05% to 0.1% by mass Zn, 0.92% to 0.93% by mass Mg, and the remainder consisting of Al and unavoidable impurities with respect to the total mass of the mixture.

10. The method according to claim 1, wherein the aging temperature is 185° C., and the aging time is 4 hr to 7 hr.

11. The method according to claim 1, wherein the aging temperature is 200° C., and the aging time is 1 hr. to 4 hr.

12. The method according to claim 1, wherein the aging temperature is 200° C., and the aging time is 1 hr. to 2 hr.

13. The method according to claim 1, wherein x is 75, the aging temperature is 200° C., and the aging time is 1 hr. to 2 hr.

14. The method according to claim 1, wherein x is equal to 40% by mass or more and 50% by mass or less, the aging temperature is 200° C., and the aging time is 1 hr. to 4 hr.

15. The method according to claim 1, wherein x is equal to 40% by mass or more and 50% by mass or less, the aging temperature is 200° C., and the aging time is 2 hr. to 4 hr.

16. The method according to claim 1, wherein x is equal to 40% by mass or more and 50% by mass or less, the aging temperature is 200° C., and the aging time is 3 hr. to 4 hr.

* * * * *